(12) United States Patent
Stone

(10) Patent No.: US 7,736,122 B1
(45) Date of Patent: Jun. 15, 2010

(54) SELF-ORIENTING SEALS AND METHODS

(75) Inventor: Stephen S. Stone, East Haven, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 868 days.

(21) Appl. No.: 11/550,947

(22) Filed: Oct. 19, 2006

Related U.S. Application Data

(60) Provisional application No. 60/729,468, filed on Oct. 20, 2005.

(51) Int. Cl.
*F03B 11/02* (2006.01)
(52) U.S. Cl. .......................................... 415/1; 415/200
(58) Field of Classification Search ............. 415/214.1, 415/220, 1; 277/616, 618, 628, 630, 640, 277/647
See application file for complete search history.

(56) References Cited

U.S. PATENT DOCUMENTS

| 3,820,799 | A | * | 6/1974 | Abbes et al. ................. 277/647 |
| 4,114,907 | A | * | 9/1978 | Abbes et al. ................. 277/647 |
| 4,153,281 | A | * | 5/1979 | Ahlstone .................. 285/146.3 |
| 4,218,067 | A | * | 8/1980 | Halling ........................ 277/605 |
| 4,284,479 | A | * | 8/1981 | Schulte ....................... 202/248 |
| 4,561,662 | A | * | 12/1985 | de Villepoix et al. ........ 277/644 |
| 4,602,888 | A | * | 7/1986 | Court et al. ................... 403/28 |
| 5,022,663 | A | * | 6/1991 | Fages et al. ................. 277/644 |
| 5,354,072 | A | * | 10/1994 | Nicholson ................... 277/647 |
| 5,797,604 | A | * | 8/1998 | Inagaki et al. ............... 277/618 |
| 6,631,910 | B2 | * | 10/2003 | Caplain et al. .............. 277/644 |
| 7,198,303 | B2 | * | 4/2007 | Brophy et al. .............. 285/267 |
| 7,372,933 | B2 | * | 5/2008 | Ohsono et al. .............. 376/272 |
| 7,497,443 | B1 | * | 3/2009 | Steinetz et al. .............. 277/644 |
| 2003/0133792 | A1 | * | 7/2003 | Vedantam et al. ........ 415/214.1 |

FOREIGN PATENT DOCUMENTS

EP 134068 A1 * 3/1985

* cited by examiner

*Primary Examiner*—Edward Look
*Assistant Examiner*—Aaron R Eastman
(74) *Attorney, Agent, or Firm*—Bachman & LaPointe, P.C.

(57) ABSTRACT

A seal segment includes a C sectioned seal member. An energizing spring is positioned within the seal member. An orientation block is secured at an end of the seal member.

20 Claims, 5 Drawing Sheets

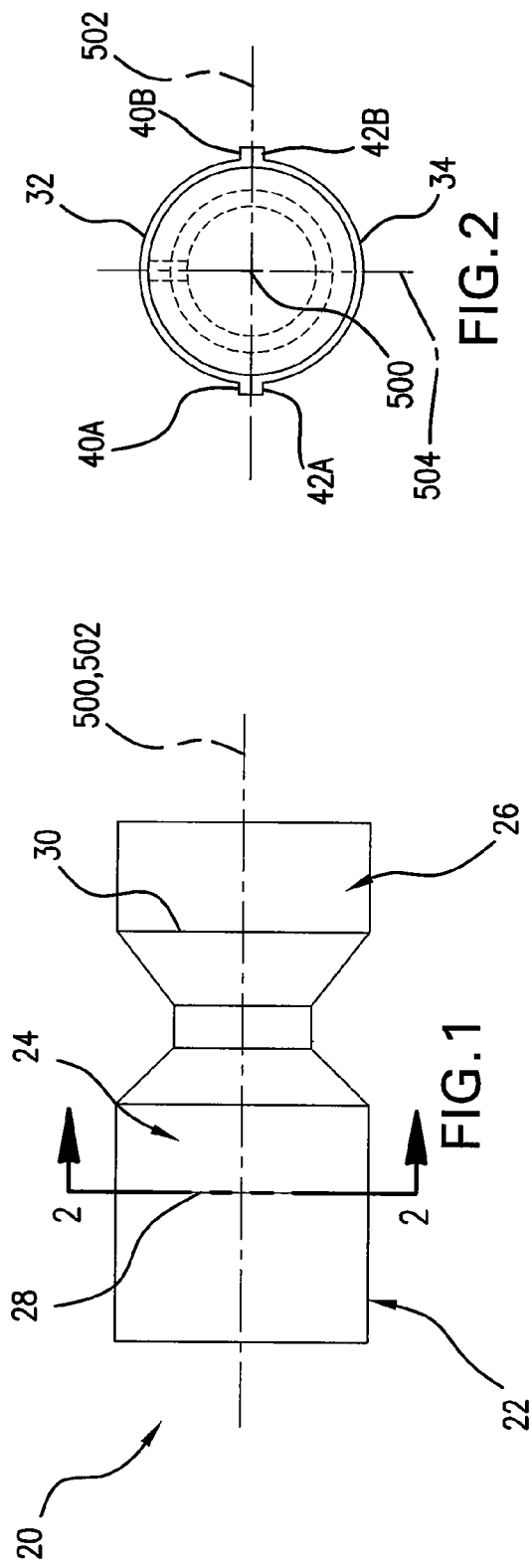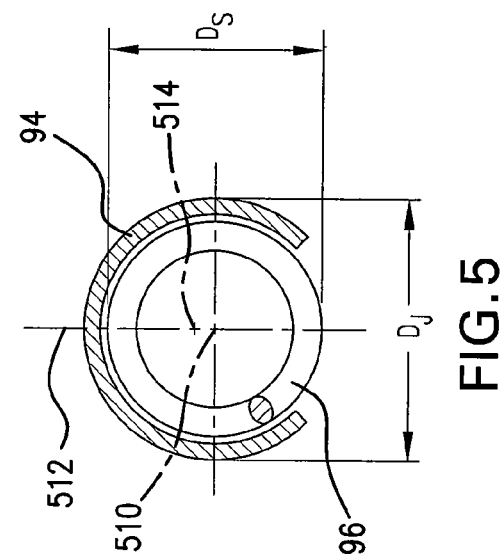

US 7,736,122 B1

SELF-ORIENTING SEALS AND METHODS

CROSS-REFERENCE TO RELATED APPLICATION

Benefit is claimed of U.S. Patent Application Ser. No. 60/729,468, filed Oct. 20, 2005, and entitled "Self Orienting Straight C-Seal", the disclosure of which is incorporated by reference herein as if set forth at length.

BACKGROUND OF THE INVENTION

The invention relates to metallic seals. More particularly, the invention relates to the sealing of split cases of steam turbines and industrial gas turbines.

Stationary turbine installations include steam turbines and industrial gas turbines. A principal use is for power generation. Common configurations for such turbines include horizontally-split cases with upper and lower case sections joined along a pair of diametrically opposed mating flanges. The flanges may be sealed such as with a gasket material.

SUMMARY OF THE INVENTION

One aspect of the invention involves a seal segment. The segment includes a C-sectioned seal member. An energizing spring is positioned within the seal member. An orientation block is secured at an end of the seal member.

In various implementations, the seal member may extend straight between first and second ends. The orientation block may be welded to the seal member. The orientation block may be secured by a fastener to the energizing spring.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a schematic side view of a stationary turbomachine.

FIG. 2 is a schematic transverse sectional view of the turbomachine of FIG. 1.

FIG. 5 is a sectional view of the seal of FIG. 4 in a relaxed condition.

Like reference numbers and designations in the various drawings indicate like elements.

DETAILED DESCRIPTION

Figure 3:
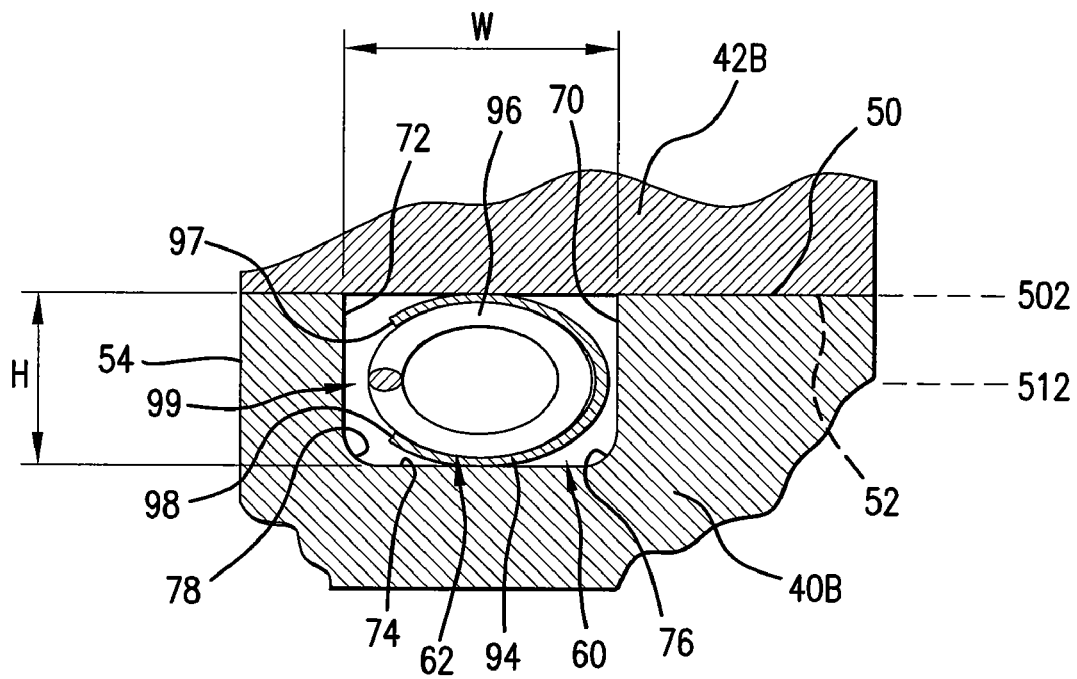
FIG. 3 is a sectional view of mated flanges of the turbomachine of FIG. 2.

FIG. 1 shows a turbomachine 20 having a central longitudinal axis 500 which forms an axis of rotation of the turbomachine rotors. The axis 500 falls along a transverse horizontal centerplane 502. The turbomachine has a case assembly including an exemplary front (upstream) case 22, intermediate case 24, and rear case 26. The intermediate case 24 is shown having ends fore and aft 28 and 30 at junctions with the front and rear cases.

FIG. 2 shows the intermediate case 24 as including upper and lower halves 32 and 34. In the exemplary turbomachine, these halves are symmetric across a vertical centerplane 504. The halves 32 and 34 are joined along respective pairs of flanges 40A, 42A and 40B, 42B having faces 50 and 52 at junctions along the horizontal centerplane 502. The flanges of each pair may be secured together such as via bolting. Along the intermediate case 24, its interior surface 54 (FIG. 3) varies in diameter relative to the centerline 500 to accommodate the diameters of the various rotating components. The flanges generally follow such change in radius.

Figure 4:
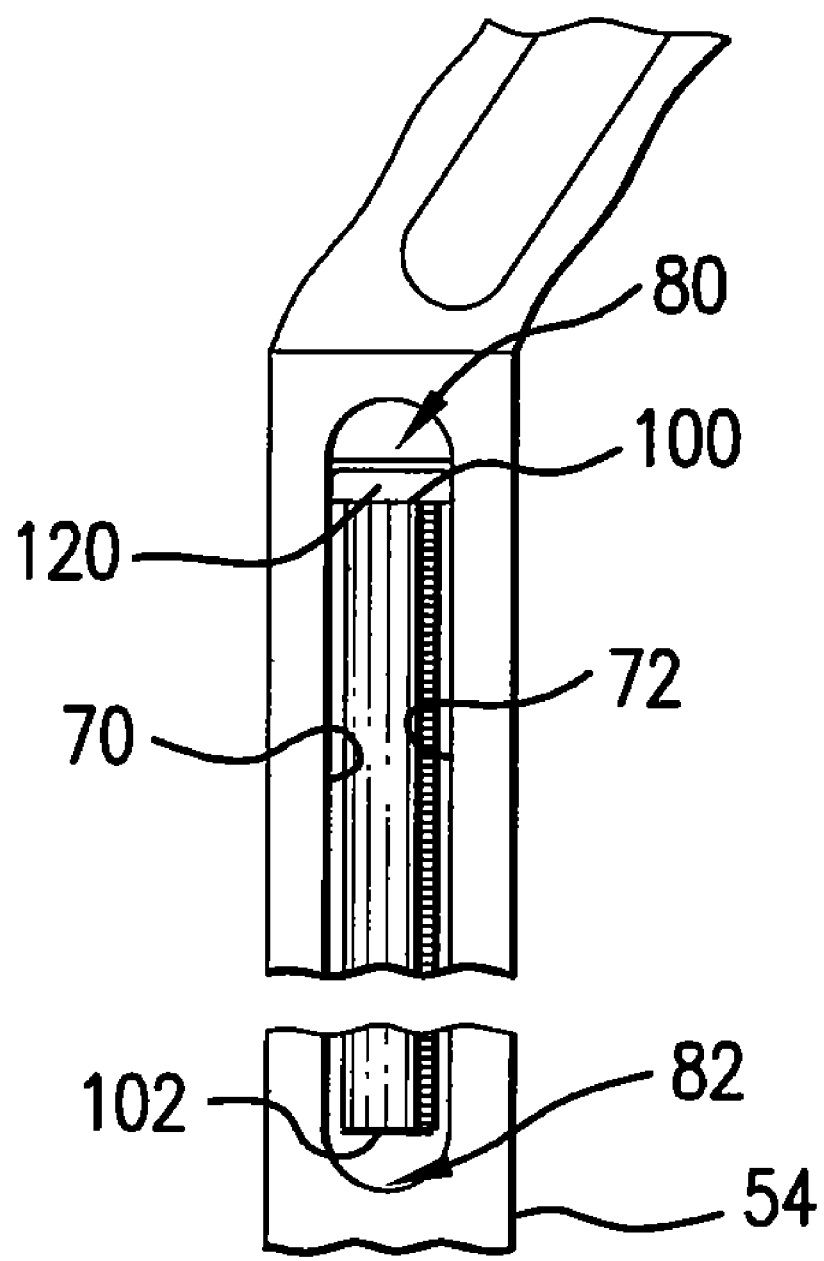
FIG. 4 is a plan view of one of the flanges of FIG. 2 including a seal-containing channel.

The surface 50 may initially be essentially flat and uninterrupted. A series of channel segments 60 may then be machined through the surface 50 to accommodate associated seal segments 62. FIG. 3 shows a channel 60 closely spaced apart from the interior surface 54. An exemplary channel 60 is essentially a right channel with a pair of sidewalls 70 and 72 and a base 74 with rounded junctions 76 and 78. FIG. 4 shows the channel 60 as extending between a first end 80 and second end 82.

FIGS. 3 and 5 show further details of an exemplary seal 62. The exemplary seal is a spring compression seal having a straight body formed by a C-sectioned outer jacket (seal member) 94 and a coiled energizing spring 96 concentrically within the jacket (e.g., along a seal centerline (axis) 510). The exemplary spring 96 has an outer diameter labeled as $D_S$. The exemplary jacket 94 has a diameter $D_J$ which forms a relaxed thickness of the seal and jacket normal to a plane 512 discussed below. The jacket extends more than 180° around the axis 510 between edges 97 and 98 to form two sealing faces. The exemplary jacket extends approximately 270° around the axis 510 in a relaxed condition.

Figure 7:
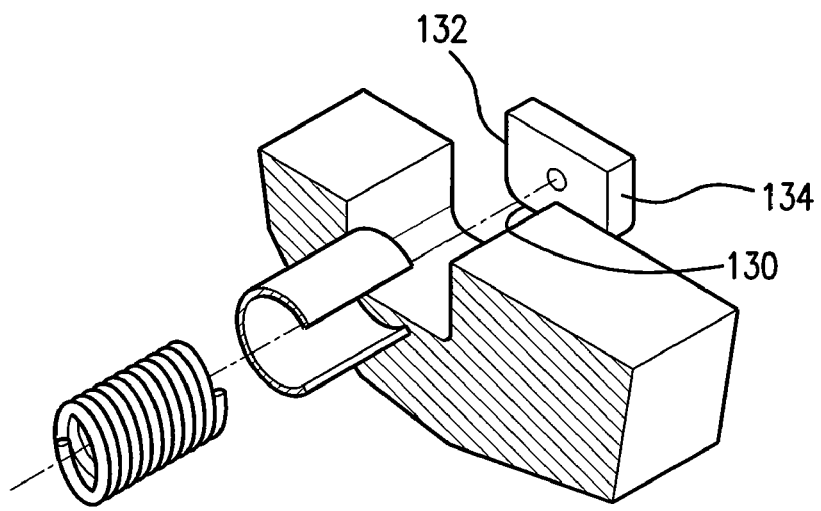
FIG. 7 is an exploded view of the seal end portion of FIG. 6.
Figure 6:
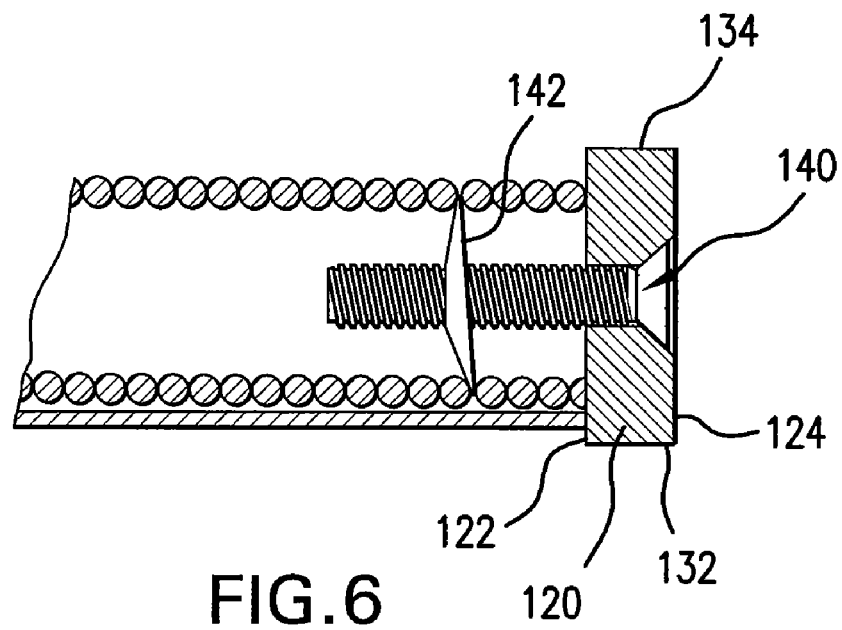
FIG. 6 is a longitudinal sectional view of an end portion of the seal.

The seal body and its axis 510 extend from a first axial end 100 to a second axial end 102 which, when installed, fall close to the channel segment ends 80 and 82. In an exemplary installation, there is a pressure gradient across the seal. For example, there may be high internal pressure within the case and relatively low external pressure. The internal environment may also be relatively high temperature. It is advantageous to orient the seal so that the gap 99 between edges 97 and 98 faces the relatively high pressure/temperature environment. Due, however, to the gap, the seal center of gravity 514 (FIG. 5) is shifted away from the gap. This center of gravity offset can cause the straight seal to roll into an undesirable orientation. The pressure difference across the seal may further encourage rolling. The seal may roll in any of several situations. The seal may roll after being placed in the channel but before assembly. The seal may also roll during assembly. The rolling can cause the gap to line with either the channel base 74 or the adjacent flange face 52 so that the spring, rather than the jacket, engages the associated flange. Accordingly, means for controlling rolling of the seal is advantageously provided. FIG. 6 shows exemplary means as including an end block 120 mounted at the first end 100 of the seal body. The exemplary block 120 includes an inboard face 122 and an outboard face 124. FIG. 7 shows the block as having a planform/cross-section corresponding to the cross-sectional shape of the channel so as to interfit with the channel to prevent seal rotation about the seal body axis. Thus, the exemplary block 120 has a base 130 and side faces 132 and 134 normal thereto. In the exemplary block 120, there are rounded transition between the base and side faces. The exemplary block has a central aperture accommodating a screw 140 (e.g., a socket head machine screw). The threaded shaft of the screw is received in a retainer 142 whose perimeter is captured by the spring 96.

In an exemplary manufacture sequence, the seal jacket and spring are cut to a desired length (e.g., as a unit). The block 120 is machined (e.g., from bar or strip stock). The screw 140 and retainer 142 are mated to the block and inserted into the spring. The block is oriented relative to the jacket and tack welded thereto. The tack weld of the block to the adjacent jacket end preserves the relative orientation during handling and initial stages of installation. The seal assembly is then placed in the channel. The seal assembly may be transiently secured in place via material such as adhesive, wax, grease, or the like. This may be particularly desirable in situations where the channel is or becomes inverted during assembly. This material may be sacrificed (e.g., melted/vaporized) upon turbomachine operation.

Upon compressive assembly of the two flanges, the seal is compressed. This seal compression may break the tack weld. With the tack weld broken, the screw and retainer serve to retain the block to the segment. This retention may help prevent undesirable ingestion of the block by the turbomachine 20 (e.g., when the case is next opened). In some implementations, the retention may provide a residual orientation maintaining function for the jacket (e.g., a frictional retention).

Figure 8:
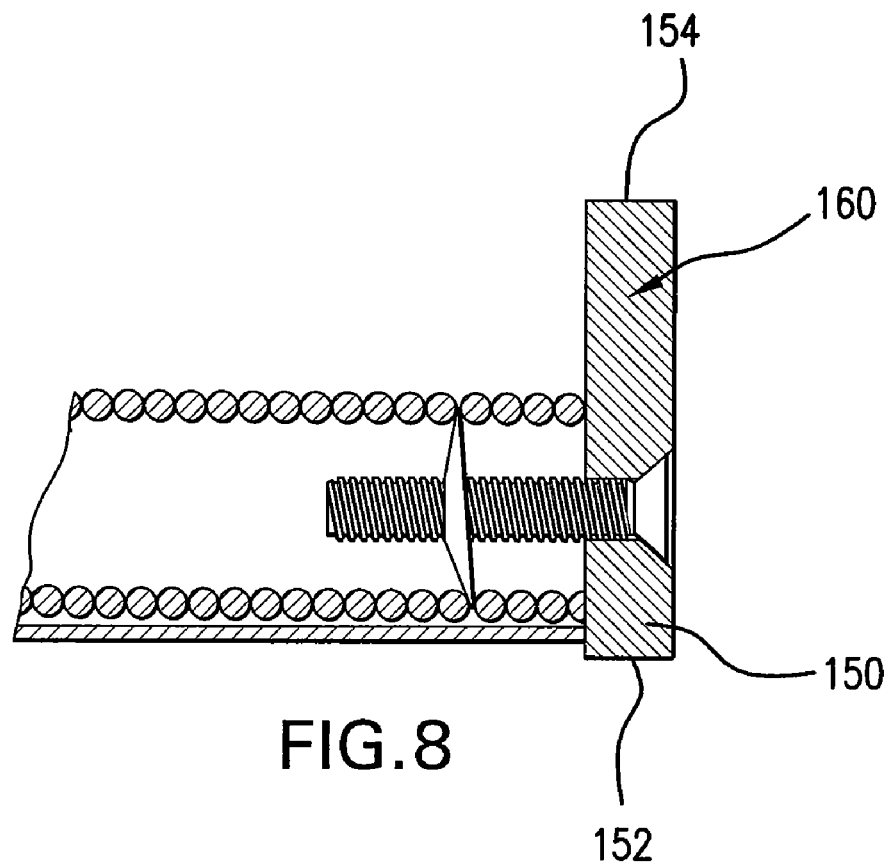
FIG. 8 is a longitudinal sectional view of an alternate seal end portion.
Figure 9:
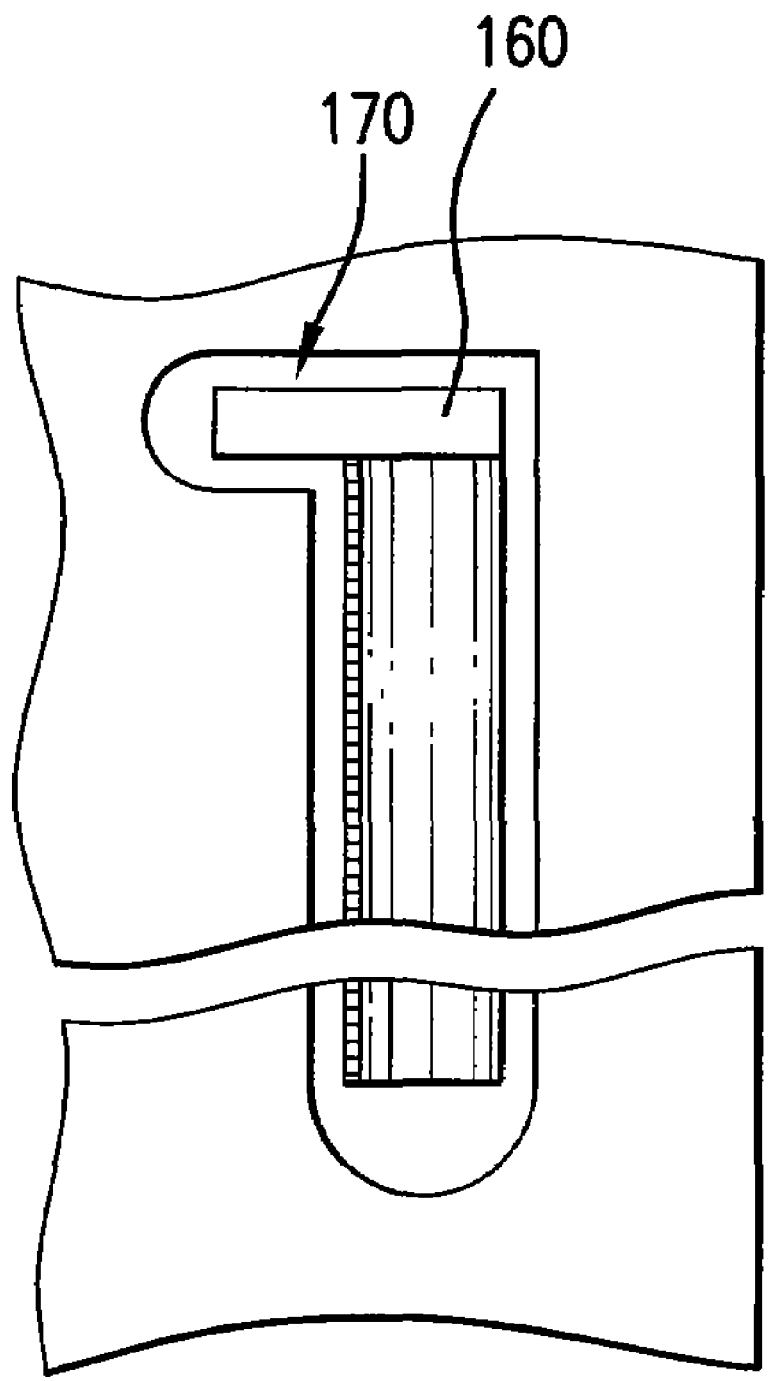
FIG. 9 is a plan view of a flange having a channel containing the seal of FIG. 8.

A further keying effect may be provided by an asymmetry of the block such that the seal can be installed with its gap 99 facing only one of the two channel sidewalls. FIG. 8 shows an alternative block 150 otherwise similar to the block 120 but wherein the second side face 154 is displaced asymmetrically of the first face 152 by a protruding portion 160 which would extend beyond the associated channel sidewall. Accordingly, FIG. 9 shows a branch or alcove 170 at the associated end of the channel to accommodate the portion 160.

An exemplary turbomachine 20 is a stationary industrial gas turbine (IGT) or steam turbine used for electrical power generation. Implementations of the invention may involve: (1) remanufacture/retrofit of an existing turbomachine; and/or (2) a reengineering of an existing turbomachine configuration prior to manufacture of further units. An exemplary remanufacture/retrofit implementation is performed on-site with the turbomachine shut down. The upper and lower case halves are unbolted and separated along their junction. The channels are then machined (e.g., via conventional milling) in the associated flanges. The seals may then be inserted in the respective channels. The case halves may be reassembled and the bolts tightened to compress the seals. In one example, the channels are machined in the flanges of the upper case half. This permits machining to be performed away from the rest of the turbomachine so that there is better access to the flanges and less chance of introducing debris to the turbomachine. Although machining may be performed with the upper case half inverted, reassembly involves facing the channels downward.

One or more embodiments of the present invention have been described. Nevertheless, it will be understood that various modifications may be made without departing from the spirit and scope of the invention. For example, when implemented as a remanufacturing of an existing engine or a reengineering of an existing engine configuration, details of the existing configuration may influence or dictate details of any particular implementation. Accordingly, other embodiments are within the scope of the following claims.

What is claimed is:

1. A turbine comprising:
a split casing including an upper segment and a lower segment;
a straight C-sectioned seal member; and
means at an axial end of said seal member for maintaining an orientation the seal member.

2. The turbine of claim 1 further comprising:
an energizing spring within the seal member.

3. The turbine of claim 2 wherein:
the means engages the energizing spring.

4. The turbine of claim 3 wherein:
the means includes a threaded fastener extending within the energizing spring.

5. The turbine of claim 1 wherein:
the means comprises an orientation member; and
there is a fractured weld between the orientation member and the seal member at said axial end of the seal member.

6. The turbine of claim 1 wherein:
the means further is means for keying a particular single said orientation.

7. The turbine of claim 1 wherein:
the seal member is accommodated in an upwardly-open cavity in the lower segment.

8. The turbine of claim 7 wherein:
the means is positioned to engage the cavity to orient the seal member.

9. The turbine of claim 1 wherein:
the seal member is accommodated in an upwardly-open cavity in the lower segment.

10. The turbine of claim 1 being a steam turbine.

11. A seal segment comprising:
a C-sectioned seal member;
an energizing spring within the seal member; and
an orientation block secured at an axial end of the seal member.

12. The apparatus of claim 11 wherein:
the seal member extends straight between first and second axial ends.

13. The apparatus of claim 11 wherein:
the orientation block is welded to the seal member.

14. The apparatus of claim 13 wherein:
the orientation block is secured by a fastener to the energizing spring.

15. The apparatus of claim 11 wherein:
the orientation block is secured by a fastener to the energizing spring.

16. The seal segment of claim 11 wherein:
the orientation block is secured to the second energizing spring at an axial end of the second energizing spring.

17. A method for retrofitting a turbine comprising:
separating an upper casing segment from a lower casing segment;
removing a first seal segment from an upwardly open cavity in the lower casing segment, the first seal segment consisting essentially of a straight C-sectioned seal member and an energizing spring;
installing a second seal segment to the cavity, the second seal segment comprising a second straight C-sectioned seal member, second energizing spring, and an orientation member secured at an axial end of the second seal member, the orientation member contacting the cavity to maintain an orientation of the second seal segment; and
reassembling the upper casing segment to the lower casing segment, the reassembling compressing the second seal segment.

18. The method of claim 17 wherein:
the reassembling breaks a weld between the second seal member and the orientation member.

19. The method of claim 17 wherein:
the reassembling breaks a joint between the second seal member and the orientation member.

20. The method of claim 16 further comprising:
adding an offset portion to the cavity to accommodate a corresponding keying portion of the orientation member.

* * * * *